United States Patent Office 3,336,084
Patented Aug. 15, 1967

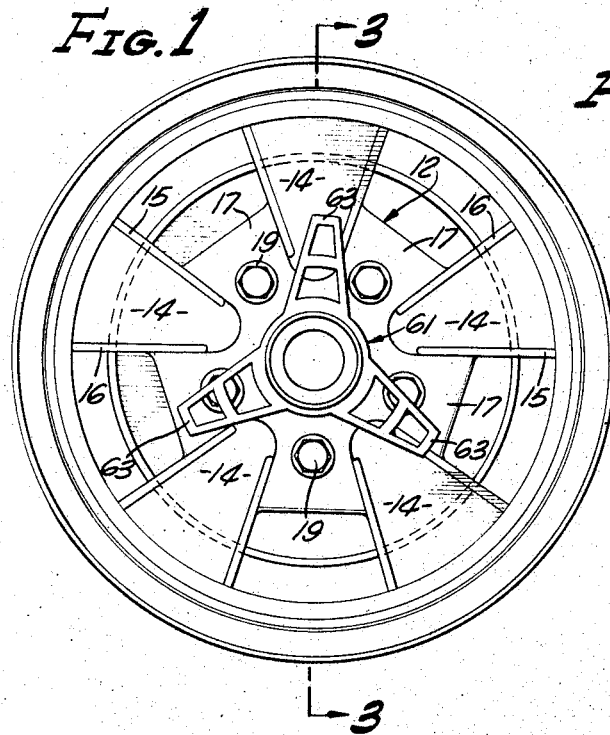
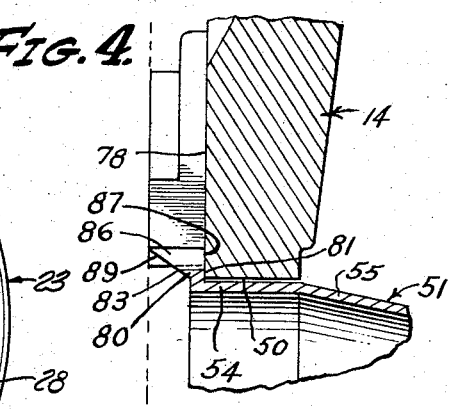
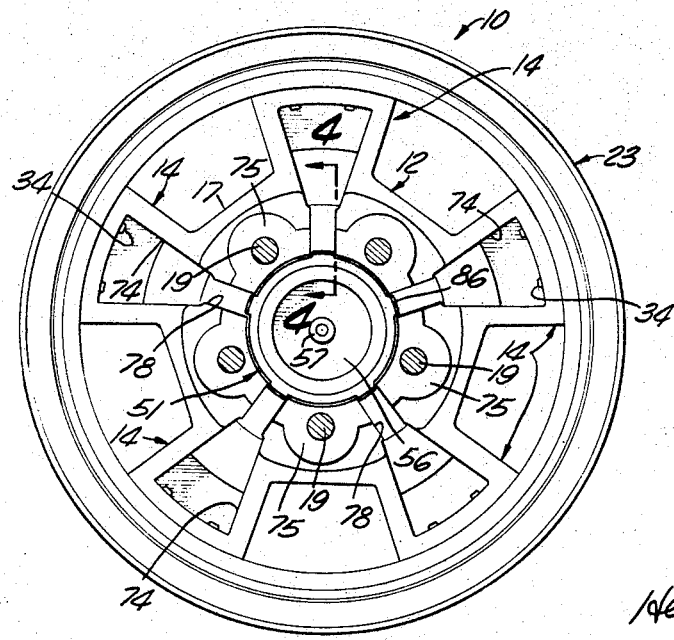
Aug. 15, 1967     A. J. FENTON     3,336,084
AXLE CAPS FOR SPORTS CAR WHEELS
Filed May 5, 1965
INVENTOR
AARON J. FENTON
BY
Herzig and Walsh
ATTORNEYS

3,336,084
AXLE CAPS FOR SPORTS CAR WHEELS
Aaron J. Fenton, 1301 Monaco Drive,
Pacific Palisades, Calif. 90272
Filed May 5, 1965, Ser. No. 453,344
2 Claims. (Cl. 301—108)

This invention relates to novel and improved axle caps, particularly adapted to use with wheels of a type especially designed for use with sports cars. Such wheels are designed to have a particularly pleasing and ornamental appearance. They may for example, be made of aluminum having parts such as the rim, made of chrome steel and may be so made as to have the appearance of being made of magnesium. The wheels have a center opening around which are bolt holes arranged in a circle adapted for attaching the wheels to the brake drums of various makes of automobiles. The axle caps are cylindrical cap members having a pleasing design and appearance and configurated to fit through the center opening in the wheel, and to be held therein covering the axle and/or hub protruding from the center of the brake drum. Preferably the axle cap has a threaded spinner member of pleasing appearance attached to the outer end thereof by way of a screw.

It is the object of this invention to provide novel and improved axle caps having improved and simplified means for mounting and holding or retaining the axle caps in the center opening of the wheel. More particularly, it is an object of the invention to provide an improved configuration of axle cap having such form that a single size of axle cap is universally adaptable to wheels having different diameters of bolt hole circles that is, having reference to the bolt holes for attaching the wheel to the studs on the brake drum of the automobile. In a preferred form of the invention, this is accomplished by providing a flange or skirt on the inner end of the axle cap of limited extent, with circumferentially spaced lugs extending from the said flange or skirt. This axle cap is particularly adapted for use with wheels having flat radial surfaces on the inside thereof adjacent the inner ends of the bolt holes with radial grooves or channels between these surfaces. The said lugs on the inner end of the axle cap fit into these radial grooves between the said flat surfaces. By reason of this configuration the diameter of the body of the axle cap can be limited such that it can be accommodated to wheels having bolt hole circles of smaller diameter whereas if the axle cap were larger, it could not be accommodated to a wheel having a bolt hole circle of that diameter.

Further objects and additional advantages of the invention will become apparent from the following detailed description and annexed drawings wherein:

FIGURE 1 is an external view of a sports car wheel having the herein invention embodied therein;

FIGURE 2 is a view of the inside of the wheel and axle cap of FIGURE 1;

FIGURE 3 is a sectional view taken along the line 3—3 of FIGURE 1; and

FIGURE 4 is a sectional view taken along the line 4—4 of FIGURE 2.

Referring now more particularly to FIGURES 1, 2, and 3 of the drawings, numeral 10 designates generally a form of sports car wheel in which the invention may be adapted. The wheel embodies a spider designated generally at 12 which may be an aluminum casting formed to have five generally triangular spokes such as designated at 14, each spoke having edge ribs as designated at 15 and 16 in FIGURE 1. Between the spokes are webs 17 having bolt holes arranged in a circle to receive stud bolts as designated at 19.

Each spoke 14 has an arcuate flange 21 at its outer edge. (See FIGURE 3.) The wheel has a rim as designated generally at 23 having a cross section as shown in FIGURE 3 which is secured to the flanges 21 at the extremities of the spokes by way of rivets such as shown at 34. The cross section of the rim 23 includes a center channel 25 and edge rims or ribs 27 and 28 with flats 31 and 32 between the center channel 25 and the edge rims or ribs. The cross section of the rim 23 is of course such as to receive the tire.

Numeral 40 designates the axle of a vehicle having a brake drum 41. The drum 41 has a cylindrical part 43 of smaller diameter and extending from this is the axle housing or hub 44. This hub has a cylindrical tapered body part 45 adjacent the outer face of the drum.

The wheel 10 has a center opening as designated at 50 which receives the axle cap designated generally at 51. The axle cap 51 as shown in FIGURES 1, 2 and 3 has a cylindrical end part as designated at 54 which fits snugly within the opening 50 within the wheel 10. It has a tapered outer part 55 having a flat end 56 having a center boss 57 having a threaded bore 58. Numeral 61 designates a rotary spinner having three extending arms or knock-offs as designated at 63, which arms extend radially as shown. The spinner 61 has a cylindrical part as designated at 65 which is of a size to snugly fit over the end of the axle cap 51, and an extending cylindrical part of larger diameter 67 from which a threaded stem 69 extends inwardly and is threaded into the bore 58 in the boss 57.

The axle cap 51 has a particular construction and configuration at the inner end which will be described in detail presently.

FIGURE 2 shows the inside of the wheel 10. The spokes 14 have depressions or recesses as designated at 74. The webs 17 between the spokes have flat surfaces as designated at 75 surrounding the bolt holes at 19 which receive the attaching studs. Between adjacent surfaces 75 there are square shouldered radial channels or grooves 78 which extend from the center opening of the wheel 50 to recesses 74 on the inside of the spokes 14.

In assembling the axle cap 51 to the wheel the spinner 61 is removed and the axle cap is inserted through the wheel opening 50 from the inside. At the inner end of the axle cap 51 it has a relatively short peripheral flange or skirt as designated at 80 which may be best seen in FIGURE 4. This flange extends radially a short distance to provide a square shoulder 81 which comes flush against the surface of the inner part of the wheel adjacent the opening 50 as shown in FIGURE 4. The inner part 54 of the axle cap 51 fits snugly within the opening 50 in the wheel. The flange 80 has an axially extending skirt part 83 which has an inner taper so that it can adapt itself to engage or accommodate the slanting surface on the part 45 of the extending wheel axle hub 44 as shown in FIGURE 3. Extending from the flange or skirt 80 are a group of circumferentially arranged lugs as designated at 86. These lugs extend radially to provide inside square shoulders that come into flush engagement with surfaces of the wheel adjacent the opening 50 outwardly from the surfaces 81. The lugs 86 fit into the radial channels 78 between the flat surfaces 75 adjacent the bolt holes 19. The lugs 86 have tapered internal flat surfaces as shown at 80 so that they accommodate themselves to, that is they interfit against the tapered surface 45 extending from the part 43 of the brake drum 41 as shown in FIGURE 3. From the foregoing it may be observed that the axle cap 51 is retained within the opening 50 in the wheel by the extending flange 80 and also by the lugs 86 which fit into the radial channels 78 and come flush against the inside surfaces of the wheel 10. The lugs 86 further serve the purpose of preventing rotation of the axle cap 51 in the opening 50 within the wheel. It may be observed that by the particular configuration of the lugs 89 extending from the flange 89, the purposes intended are served, that is the lugs 86 provide a skirt formation having internal tapered surface of a diameter which is able to engage the slanting surface 45 on the outside of the brake drum 41. This diameter is larger than that of the opening 50 in the wheel. By this means it is possible to limit the diameter of the axle cap 51 sufficiently so that it can accommodate wheels having a circle of bolt holes of such diameter, that this circle of bolt holes could not be accommodated with an axle cap of larger size. In other words the particular construction as described including the extending lugs makes it possible to limit the size of the axle cap so that it can accommodate wheels having bolt hole circles of smaller diameter as described. In this way the axle cap becomes universal, being adaptable to all of the wheels it is intended for irrespective of the diameter of the bolt hole circle.

After the axle cap has been assembled as described, the wheel may be secured to the brake drum by means of the stud bolts in the conventional manner. The spinner 61 may then be attached by threading the threaded stem 69 into the boss 57. The spinner may of course be constructed of chrome or other material to provide a pleasing appearance as desired. The rim 23 of the wheel may be made of chrome steel or other material of pleasing appearance, and the ribs 15 and 16 on the outside of the spokes 14 may be polished to give a similar pleasing appearance resembling chrome or chrome steel or the like. Other parts of the wheel not having the polished chrome finish may have a more or less gray finish resembling magnesium and thereby realizing a desired pleasing appearance.

From the foregoing those skilled in the art will observe that the invention as described herein achieves and realizes all of the objects and advantages as set forth in the foregoing as well as having many additional advantages that are apparent from the detailed description. The invention provides for an improved, simplified, but very effective axle cap construction which is universal in that one size accommodates itself to the different wheels for which it is intended having varying diameters of bolt hole circles. In this form of the invention the particular configuration of the axle cap further provides the function of preventing the rotation of the axle cap relative to the wheel, and it is securely and firmly held in position and is adapted to nicely fit the brake drums involved. The invention further provides simplified forms of mounting and retaining the axle caps and the wheels for which they are intended, and in accommodation with the brake drums and extended hubs to which the wheels are attached.

The foregoing disclosure is representative of preferred forms of the invention and is to be interpreted in an illustrative rather than a limiting sense, the invention to be accorded the full scope of the claims appended hereto.

What is claimed is:

1. In combination with an automobile wheel having a circular center opening and circularly arranged bolt holes, an axle cap comprising a circular member having a body portion of a size to be received snugly within the opening in the wheel so as to cover the hub on the brake drum, the said cap having an end flange configurated to engage the surfaces adjacent the opening in the wheel on the inside thereof, the said cap having a tapered external part adapted to receive the spinner member attachable to the cap, the said wheel having flat surfaces on the inside thereof at the inner ends of the bolt holes with radial grooves formed between said flat surfaces, the said flange on the axle cap having a size to be engageable with the surfaces on the inside of the wheel adjacent the opening therethrough, and means comprising lugs extending from the said flange and having radially extending surfaces configurated to engage in said radial grooves in the wheel.

2. A construction as in claim 1 where said extending flange on the axle cap and said extending lugs having tapered internal surfaces forming a skirt configurated to snugly fit over a slanting annular surface on the wheel brake drum adjacent the face thereof.

References Cited

UNITED STATES PATENTS 1,646,867  10/1927  Nelson.

FOREIGN PATENTS 793,465  4/1958  Great Britain.
864,129  3/1961  Great Britain.
942,654  11/1963  Great Britain.

BENJAMIN HERSH, *Primary Examiner.*

MILTON BUCHLER, RICHARD J. JOHNSON,
*Examiners.*